United States Patent [19]

Cecchin et al.

[11] 4,294,721

[45] Oct. 13, 1981

[54] PROCESS FOR PREPARING COMPONENTS OF CATALYSTS FOR POLYMERIZING ALPHA-OLEFINS AND MIXTURES THEREOF WITH ETHYLENE

[75] Inventors: Giuliano Cecchin, Ferrara; Enrico Albizzati, Arona, both of Italy

[73] Assignee: Montedison S.p.A., Milan, Italy

[21] Appl. No.: 134,773

[22] Filed: Mar. 28, 1980

Related U.S. Application Data

[63] Continuation of Ser. No. 921,717, Jul. 3, 1978, abandoned.

[30] Foreign Application Priority Data

Jul. 4, 1977 [IT] Italy ................................ 25345 A/77

[51] Int. Cl.$^3$ ................................................ C08F 4/64
[52] U.S. Cl. .................................. 252/429 B; 526/125
[58] Field of Search ....................................... 252/429 B

[56] References Cited

U.S. PATENT DOCUMENTS 3,642,746  2/1972  Kashiwa et al. ............. 252/429 B X
4,143,223  3/1979  Toyota et al. ............... 252/429 B X

*Primary Examiner*—Patrick Garvin

[57] ABSTRACT

A process for preparing components of catalysts for the polymerization of alpha-olefins and mixtures thereof with ethylene is disclosed. The process comprises reacting a Ti compound having at least oe Ti-halogen linkage with either (1) a mixture of a hydrocarbyl electron-donor compound ED which does not contain active H atoms and an adduct (a) of a Mg dihalide with at least one hydrocarbyl electron-donor compound AH containing active H atoms, or (2) with an adduct (b) of at least a Mg dihalide with a compound AH and ED defined in (1), adducts (a) and (b) being obtained without co-grinding of the Mg dihalide with compounds AH and ED.

7 Claims, No Drawings

PROCESS FOR PREPARING COMPONENTS OF CATALYSTS FOR POLYMERIZING ALPHA-OLEFINS AND MIXTURES THEREOF WITH ETHYLENE

This is a continuation of application Ser. No. 921,717, filed July 3, 1978, and now abandoned.

THE PRIOR ART

U.S. Pat. No. 3,642,746 describes catalysts useful in the polymerization of olefins and which consist of the product prepared by mixing an aluminium alkyl with a solid catalyst-forming component obtained by reacting adducts of $MgCl_2$ and an alcohol with a halogenated Ti compound such as $TiCl_4$.

However, those catalysts, if used as such in the polymerization of an alpha-olefin like propylene, do not result in the stereoregular polymerization of the propylene to a prevailingly isotactic polymer, i.e., a polymer made up for more than 50% of isotactic macromolecules. This is due to both the low activity and low stereospecificity of said catalysts.

Recently, it was found that it is possible to obtain catalysts having both good activity and good stereospecificity by contacting an Al alkyl partially complexed with an electron-donor compound, with a solid catalyst-forming component by reacting $TiCl_4$ with the product obtained by grinding $MgCl_2$ in the presence of an alcohol and of an electron-donor compound in a suitable device such as a ball mill. However, in preparing said catalysts, it is necessary to subject the Mg dihalide to the mechanical activation treatment, i.e., the grinding, in the presence of the alcohol and of the electron-donor compound.

In British Pat. No. 1,485,234, there are described catalysts for the polymerization of alpha-olefins and prepared by mixing an Al alkyl compound partially complexed with a Lewis base with a solid catalyst-forming component prepared from adducts of Mg dihalides with alcohols and a Ti halide, e.g., $TiCl_4$. In order to obtain highly active and stereospecific catalysts, it is necessary to pre-treat the adduct with a substance capable of reacting with the alcohol, prior to contacting the adduct with the Ti halide.

THE PRESENT INVENTION

One object of this invention is to provide improved catalysts which exhibit both good activity and good stereospecificity in the polymerization of alpha-olefins even starting with adducts of Mg dihalides with alcohol and, in general, with compounds containing active hydrogen atoms, while avoiding both the step of cogrinding the Mg dihalide with an electron-donor compound which does not contain active hydrogen, to activate the Mg dihalide, and the pretreatment of the adduct with substances capable of reacting with the alcohol and removing it from the adduct.

This and other objects are accomplished by the invention which provides new catalyst-forming components comprising a Mg dihalide and complexes of the Mg dihalide with a Ti compound and an electron-donor compound, said components being composed of the solid product of the reaction of a halogenated Ti compound containing at least a Ti-halogen linkage with at least one of the following substances:

(1) an electron-donor compound ED which does not contain active hydrogen atoms and an adduct (a) of a Mg dihalide and at least one organic electron-donor compound AH which does contain active hydrogen atoms, the electron-donor compound being present in the adduct (a) in an amount higher than 0.5 mole/mole of Mg dihalide, and said electron-donor compound ED being reacted in an amount higher than 0.05 mole/mole of compound AH of the adduct; or (2) an adduct (b) of at least a Mg dihalide and compounds AH and ED as defined in (1), compound ED being present in an amount of from 0.05 to 1.0 mole/mole of compound AH, and adduct (b) being prepared without cogrinding compound ED with the Mg dihalide.

The amount of compound ED which remains on the solid product obtained by contacting the halogenated Ti compound with at least (1) or (2), after extraction thereof with $TiCl_4$ at 80° C. for two hours, is comprised between 0.3 mole and 3.0 moles for each gram-atom of Ti, and the amount of Ti compounds extractable from the solid product with $TiCl_4$ at 80° C. is lower than 50%.

The composition of adduct (a), with regard to its essential components, is represented by the following formula:

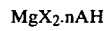

$$MgX_2 \cdot nAH$$

wherein:
X is a halogen, preferably Cl or Br;
$0.5 \leq n \leq 6$ and preferably $1 \leq n \leq 4$;
AH is an organic compound containing active hydrogen atoms preferably selected from amongst aliphatic alcohols and, in particular, those containing from 2 to 8 carbon atoms, cycloaliphatic alcohols, nonortho-substituted phenols, such as, for example, phenol, 4-t-butylphenol, p-cresol and beta-naphthol. Adducts obtained from mixtures of lower aliphatic alcohols as for instance ethanol and 1-butanol with higher aliphatic alcohols as 1-octanol, 2-ethyl-1-hexanol, are of particular interest for obtaining highly active catalysts.

Results analogous to those attainable with the alcohols can be achieved also with silanols, primary amines and amides.

Adducts (a) and (b) may contain, in combined form, besides compounds AH and ED, also metal compounds, for example, compounds of tetravalent or trivalent Ti, in particular $TiCl_4$, compounds of Si and Al, such as alkyl silicates, $Si(OC_2H_5)_4$, $CaCl_2$, $CaI_2$ and Al alcoholates.

Adduct (a) can be prepared by different methods. A presently preferred method consists in dissolving the Mg dihalide in the active hydrogen-containing compound, and in successively precipitating the adduct by cooling the solution and by adding an inert liquid that does not dissolve the adduct.

Another method consists in reacting, according to known methods, a R Mg X compound (in which R is an alkyl, cycloalkyl or aryl radical containing 1 to 20 carbon atoms; X is a halogen) with an alcohol R OH (in which R has the same meaning as above) and with a hydrogen halide to form an adduct $MgX_2 \cdot nROH$ in which n is a number comprised between 0.5 and 6.

The RMgX compound is used in the form of a complex with an ether, as dibutyl ether, dissolved in a hydrocarbon (toluene, benzene) or it is dissolved in diethyl ether or used in suspension in an apolar solvent as isooctane.

According to another method Mg metal, the alcohol ROH and hydrogen halide are reacted together to form the adduct $MgX_2 \cdot nROH$.

Adducts (a) can be prepared also by reacting a Mg alcoholate having the formula ROMgX (X=halogen; R=an alkyl, aryl or cycloalkyl radical with 1 to 20 carbons) with hydrogen halide.

The ROMgX compound can be prepared according to known methods; one of these consists in reacting a Grignard reagent with a carbonyl compound selected in particular amongst the aldehydes, ketones, esters and the halides of the carboxylic acids.

Any anhydrous Mg dihalide or containing up to 1 mole water per g atom Mg can be used for preparing adducts (a) and/or (b).

For instance the adducts (a) and/or (b) can be prepared from Mg di-halides obtained by dehydration, with halosilones as $(CH_3)_2 SiCl_2$ or $(CH_3)_3 SiCl$, of hydrated Mg halides as $MgCl_2$ containing 1 to 6 moles water.

Adducts (b) can also be prepared by various methods.

A presently preferred method consists in suspending the Mg dihalide, the AH and ED compounds in an inert hydrocarbon solvent (such as hexane, heptane, etc.) or in a halogenated hydrocarbon solvent (such as $CCl_4$, chloroform, etc.), heating the suspension to a temperature generally comprised between 40° C. and the solvent boiling temperature, and isolating the reaction product by evaporation of the solvent.

According to another method, electron-donor compound ED is reacted with a pre-formed adduct (a). A further method consists in reacting the compound containing active hydrogen atoms with an adduct previously formed between the Mg dihalide and electron-donor compound ED.

The reaction conditions are the same as indicated for the preparation of adduct (a). It is also possible to melt an adduct of type (a), to add compound ED to the melt, then to separate adduct (b) by cooling or by the addition of liquids which are not solvents for the adduct.

In some cases, and in particular when a polymer having controlled particle sizes is to be obtained, it is advisable to employ adducts (a) and/or (b) in the form of spheroidal particles having a controlled particle size distribution.

We have observed that the product of the reaction between the Ti compound and the adduct in the microspheroidal form retains the form and the morphological properties of the starting adduct and yields final catalysts which result in spheroidal polymers having increased mechanical resistance and specific flow characteristics.

The preparation of the adducts in the microspheroidal form can be effected according to known methods, such as, for example, those described in U.S. Pat. No. 3,953,414.

Electron-donor compound ED, utilized both in the reaction between the Ti compound and adduct (a), and as a component of adduct (b), may be any compound capable of forming addition compounds with the Mg dihalides.

Particularly suitable ED compounds are the alkyl, aryl and cycloalkyl esters of the aromatic acids, in particular the alkyl esters of benzoic acid and its derivatives. Examples of specific ED compounds include ethyl benzoate, n-butyl benzoate, methyl p-toluate and methyl p-methoxybenzoate.

Interesting results have also been obtained by using as ED compound, alkyl or alkyl-aryl ethers, such as di-n-butyl ether and ethylphenyl ether, ketones, e.g., acetylacetone and benzophenone; and diamines such as N,N,N',N'-tetramethyl-ethylene diamine.

In some instances, especially when the Ti compound is reacted with adduct (a), it is advisable to form compound ED in situ, for example by esterification reaction. For instance, when adduct (a) and/or (b) contains an alcohol or a phenol, the reaction resulting in the new catalyst component can be effected in the presence of a halide of an aromatic carboxylic acid, such as, e.g., benzoyl chloride. The treatment with benzoyl chloride can take place, also, after the reaction between the Ti compound and adduct (a).

The amount of electron-donor compound ED employed in admixture with (a) or present in (b) is such that at least 0.5 and up to 3 moles of such compound remains fixed to the catalytic component.

In general the compound ED is reacted with (a) in a molar ratio with compound AH of (a) ranging from 0.05:1 to 5:1.

The compound ED can be used also as adduct with electron-acceptor compounds or Lewis acids different from the Mg dihalides. For instance it can be used as adduct with the halogenated Ti compound itself or with compounds as $AlCl_3$, $BCl_3$, $CaCl_2$, $CaI_2$.

The reaction with the Ti compound is carried out in the liquid phase, preferably using an excess of liquid Ti compound, and separating the unreacted Ti compound at the conclusion of the reaction. Such separation is effected at a temperature at which the amount of Ti compounds soluble in $TiCl_4$ at 80° C. that remains in the catalyst component is lower than 50% by weight in respect of the total content of Ti compounds, and preferably lower than 20% by weight.

As Ti compounds there are preferably employed the hydrocarbon soluble halogenated Ti compounds as for instance $TiCl_4$, $TiBr_4$, $TiI_4$ and the hydrocarbon-soluble halogen alcoholates.

If $TiCl_4$ is used as Ti compound, and the reaction is conducted in said $TiCl_4$ as reaction medium, then the reaction temperature is generally comprised between 50° C. and the boiling point of $TiCl_4$, in particular between 100° and 135° C.

The separation of the $TiCl_4$ in excess, not fixed on the carrier, is preferably conducted at a temperature ranging from 80° to 135° C. To promote precipitation of the solid reaction product, a hydrocarbon solvent can be added. The ratio by volume between such solvent and $TiCl_4$ is generally lower than 0.4.

The treatment with $TiCl_4$ can be repeated several times, for example twice.

After the reaction with $TiCl_4$ the solid is washed with a hydrocarbon solvent, whereupon it can be dried or used in suspension in a hydrocarbon solvent. It comprises, in a chemically bound form, a Ti compound and an electron-donor compound ED.

The Ti compound or compounds are not extractable with $TiCl_4$ at 80° C. for more than 50%, preferably for not more than 20%; the electron-donor compound is present in the catalyst component after the treatment in an amount of at least 0.5 and up to 3 moles per gram atom of Ti.

When a hydrocarbon insoluble Ti compound is used, as $TiCl_3$ or compositions containing $TiCl_3$ as the product 3 TiCl$_3$·AlCl$_3$, it is preferable to subject the catalyst component to a treatment with compounds like ICl$_3$ or I$_2$ dissolved in hydrocarbon diluents in order to solubilize and extract a fraction of the Ti compound (not less than 20-30%).

The catalyst component includes, therefore, as essential elements, from 0.5 to 10% by weight (expressed as metallic Ti) of Ti compounds, from 10 to 20% by weight (expressed as metallic Mg) of a Mg dihalide, part of which is in the form of a complex with the Ti compound and with the electron-donor compound, and from 0.5 to 3 moles of an electron-donor compound ED per gram atom of Ti.

When the solid product is prepared from the Ti compound adducts with alcohols, the alkoxyl groups may be present in amounts of from 0.5 to 5% by weight.

Besides the essential elements, there can also be present, in the adduct, organic and inorganic solid diluents or supports which do not react with Mg dihalides. Examples of these diluents are SiO$_2$, Al$_2$O$_3$, MgO, TiO$_2$, B$_2$O$_3$, Na$_2$CO$_3$ and polymers such as polyethylene, polypropylene, polystyrene, polytetrafluoroethylene.

The final catalysts for the polymerization of alphaolefins and mixtures thereof with ethylene according to the present invention include the product obtained by mixing (A) an Al alkyl compound, of which preferably at least 5 up to 90% is in the form of an addition product with an electron-donor compound; with
(B) a catalyst component as defined hereinabove.

Any electron-donor compound capable of forming complexes with the Al alkyl compound can be utilized for preparing component (A). Said component can be prepared prior to the contact with component (B), or the Al alkyl compound and the electron-donor compound can be contacted separately with component (B). It is possible, also, to contact component (B) first with the electron-donor compound and then with the Al alkyl compound or vice-versa. The preferred procedure consists in pre-contacting the Al alkyl compound with the electron-donor compound before mixing component (A) with component (B).

The amount of electron-donor compound used for preparing component (A) is such that from 5 to 90% of the Al alkyl, preferably from 25 to 50%, is in the combined form, and generally such amount is comprised between 0.1 and 0.9 mole per mole of Al alkyl, preferably from 0.2 to 0.4 mole.

Particularly suitable electron-donor compounds for preparing component (A) are the esters of the aromatic acids. Examples of such esters are the alkyl benzoates and derivatives thereof containing alkyl, alkoxyl or hydroxyl substituents or halogen atoms in the benzene ring.

Examples of these compounds include: ethyl p-amino benzoate, methyl p-toluate, ethyl p-hydroxybenzoate, ethyl 3,4-dihydroxybenzoate, ethyl 3,6-dichloro-4-hydroxy-benzoate.

Other examples of useful esters are the esters of aliphatic carboxylic acids having 1 to 10 carbon atoms, such as, e.g., ethyl acetylacetonate, or the esters of inorganic acids, such as ethyl carbonate and ethyl silicate and the alkyl phosphates and phosphites.

Additional useful electron-donor compounds are the ethers, ketones, aldehydes, aliphatic and aromatic carboxylic acids, quinones, anhydrides and halides of the aliphatic and aromatic carboxylic acids, secondary and tertiary amines, amides, lactones, phenols, alcohols, organic isocyanates and alkyl-, aryl- or cycloalkyl-imides.

Specific examples of compounds belonging to the abovementioned classes are: $\gamma$-lactone of butyric acid, phenyl-methylketone, acetophenone, acetylacetone, quinone, n-butyl ether, diphenyl ether, tetrahydrofuran, ethyl-methyl ether, benzoic acid, salicyclic acid, phthalic acid, acetic acid, oxalic acid, maleic acid, phthalic anhydride, acetic anhydride, benzoyl chloride, benzamide, acetamide, propionamide, diphenyl-amine, 2-methyl-pyridine, pyridine, dimethylaniline, p-methoxy-benzaldehyde, benzaldehyde, salicylic aldehyde, benzenesulphonamides, o-methyl-phenol, 2,5-di-t-butylphenol, p-methoxy-phenol, p-hydroxy-phenol, t-butyl alcohol, ethylene glycol and diglycol-monobutyl ether.

The Al alkyl compound used to prepare component (A) of the catalyst is generally an Al-trialkyl compound or an Al alkyl compound containing two or more Al atoms bound to one another through atoms of oxygen or of nitrogen. Examples of these compounds are: Al(C$_2$H$_5$)$_3$, Al(i-C$_4$H$_9$)$_3$, Al(n-C$_4$H$_9$)$_3$,

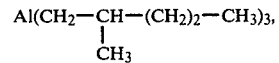

Al-(C$_{12}$H$_{25}$)$_3$, (C$_2$H$_5$)$_2$Al-O-Al(C$_2$H$_5$)$_2$,

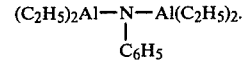

There may also be employed, with equivalent results, Al phenoxyl compounds like those described in Giannini et al, U.S. application Ser. No. 703,546 filed July 8, 1976; now U.S. Pat. No. 4,107,416, issued Aug. 15, 1978; or Al dialkyl-monohydrides.

The Al-trialkyls and the compounds containing at least two Al atoms bridge-bound to an oxygen or nitrogen atom may be employed in admixture with Al dialkyl halides or with systems that provide such halides "in situ", such as, for example, the Al alkyl dihalide+Grignard reagent system. Al alkyl halides are present in the mixture generally in an amount of 50% by moles.

The Al alkyl compound is employed in such amounts, that the Al/Ti ratio is generally comprised between 10 and 1000, preferably between 20 and 500.

The catalysts of this invention are useful for polymerizing alpha-olefins and mixtures thereof with ethylene and particularly for preparing crystalline polymers and copolymers of propylene. Other alpha-olefins, such as butene-1 and 4-methylpentene-1 can be polymerized in contact with the catalysts which can also be used to polymerize ethylene.

Crystalline copolymers of propylene can be prepared according to various conventional methods. One method consists in pre-polymerizing the propylene until at least 70-80% by weight of the total polymer is obtained and then polymerizing, in one or more steps, ethylene-propylene mixtures or ethylene alone until the polymerized ethylene amount contained in the final polymer ranges from 5 to 30% by weight.

It is possible, also, to polymerize propylene-ethylene mixtures containing relatively low percentages of ethylene and such that the polymerized ethylene content of the copolymer is lower than 5% by weight.

When component (A) of the catalysts is an Al-alkyl compound not complexed with electron-donor compounds, the catalysts are particularly suitable for preparing amorphous copolymers of ethylene and alpha-olefins.

The new catalysts are employed under conventional polymerization conditions, i.e., polymerization is effected in a liquid phase, either in the presence or absence of an inert hydrocarbon solvent, or in the gas phase.

The polymerization is generally carried out at a temperature of from 40° C. to 70° C. and at atmospheric pressure or at a higher pressure.

The following examples are given to illustrate the invention in more detail and are not intended to be limiting.

EXAMPLE 1

(A) Preparation of the catalyst component 8 g of ethyl benzoate were added dropwise and under stirring, at room temperature and in a nitrogen atmosphere, to 25 g of anhydrous $MgCl_2$ ($H_2O$ content<0.5%; crystalline form α, crystallites diameter=380 Å) suspended in 300 cc of technical n-heptane. After 1 hour, 39.2 g of n-butyl alcohol were introduced dropwise. The temperature was brought to 80° C. and the reaction was continued for 1 hour. At the conclusion, the solvent was removed by distillation at 50° C. and at a reduced pressure, thus obtaining 70 g of solid product.

25 g of the solid product were treated under stirring with 210 cc of $TiCl_4$ at 100° C. for 2 hours. 51 cc of heptane were added dropwise to the suspension under stirring. After 15 minutes stirring was stopped and the solid was allowed to decant. The liquid was hot-removed by syphoning and the solid was repeatedly washed with 130 cc of heptane each time, four times at 80° C. and the remaining times at room temperature, until the disappearance of $TiCl_4$.

The washed product was in part dried at 50° C. under vacuum and in part maintained in suspension and utilized for the polymerization tests.

The dried solid product was analyzed and found to have the following composition by weight: Ti=3.9%; Mg=16.55%; ethyl benzoate=8.6% [1]; BuOH=2.2% [1].

[1] Determined by chromatographic analysis.

(B) Polymerization of propylene in a solvent

Into a stainless steel 2.5-liter autoclave equipped with a magnetic stirrer, there were introduced 870 cc of n-hexane, previously saturated with nitrogen, and then kept in a slight propylene stream.

Separately, into a tailed flask there were introduced in the following order:

130 cc of heptane, 1 g of Al triisobutyl and 0.253 g of methyl p-toluate. After a 5-minute stirring, 0.7 cc of catalytic suspension prepared in (A) was withdrawn and added to the solution contained in the flask. After further 5 minutes the catalytic complex so obtained was introduced, in a propylene stream, into the autoclave brought to 45° C. The autoclave was closed and 275 cc of $H_2$ were introduced.

The pressure was then brought to 7 atmospheres and the temperature to 60° C. Polymerization was carried on for 4 hours at constant pressure and temperature. At the conclusion of polymerization, the resulting polymeric slurry was centrifuged at room temperature. From the centrifugation the polymer in powder form was obtained, and was dried in an oven at 70° C. in a nitrogen atmosphere.

The atactic (amorphous) polymer was obtained through evaporation of the centrifuged solution and drying. The analysis of the polymer as such (polymer in powder+atactic polymer) gave the following data concerning the catalytic residues, from which it was possible to calculate the yields: Ti=4.5 ppm; Mg=22 ppm; Cl=95 ppm.

The total isotactic index, calculated according to formula $$II_t = \frac{II\ powder \times g\ of\ powder}{g\ of\ powder + g\ of\ atactic\ polymer}$$

was equal to 94%.

The II powder is the index relating to the centrifuged and dried polymer and it was determined by extraction with boiling heptane for 3 hours. Further properties of the polymer in powder form were:

apparent density=0.36 g/cm$^3$
melt flow index=3.8 g/10 minutes
flexural rigidity=14,800 kg/cm$^2$.

EXAMPLES 2 to 5

Example 1 was repeated except that different alcohols were used. The results obtained are recorded in Table 1.

EXAMPLES 6 to 11

Example 1 was repeated except that the modalities relating to the preparation of the $MgCl_2$/n-butyl alcohol/ethyl benzoate adduct were changed. The results are reported in Table 2.

EXAMPLES 12 to 18

Example 1 was repeated, but the $MgCl_2$/alcohol/ethyl benzoate ratios were changed. The results are recorded in Table 3.

TABLE 1

| Example | Adduct | Catalyst component % by weight | | | | Catalyst residues in the polymer ppm | | | II powder | Polymer properties | |
|---|---|---|---|---|---|---|---|---|---|---|---|
| | | EB | Ti | Mg | Cl | Ti | Mg | $II_t$ | | MFI | AD |
| 2 | $MgCl_2 \cdot C_2H_5OH \cdot 0.2EB$ | 7.8 | 4.2 | 17.1 | 59.5 | 6. | 21 | 94. | 96. | 4. | 0.43 |
| 3 | $MgCl_2 \cdot 2$ isoamyl alcohol $\cdot 0.2EB$ | — | 3.45 | 17.4 | 60.15 | 4.5 | 27 | 92.5 | 95 | 4.6 | 0.38 |
| 4 | $MgCl_2 \cdot 2$-n-propanol $\cdot 0.2EB$ | 8.6 | 3.45 | 17.5 | 59.95 | 4.5 | 20 | 93.5 | 95 | 4.5 | 0.36 |
| 5 | $MgCl_2 \cdot 2C_6H_5OH \cdot 0.2EB$ | — | 1.05 | 23.45 | 67.2 | 4. | 93 | 89.5 | 92.5 | — | — |

EB = ethylbenzoate; MFI = Melt Flow Index; AD = apparent or bulk density

TABLE 2

| Example | Adduct | Preparation modalities | Catalyst component % by weight | | | | Catalyst residues in the polymer ppm | | II_t | II powder | Polymer properties | |
|---|---|---|---|---|---|---|---|---|---|---|---|---|
| | | | EB | Ti | Mg | Cl | Ti | Mg | | | MFI | AD |
| 6 | MgCl$_2$ . 2BuOH . 0.2EB | EB r.t. × 1 h; BuOH 80° C. × 1 h. Drying. | 8.6 | 3.9 | 16.55 | 61.35 | 4.5 | 22 | 94. | 96.5 | 4.2 | 0.38 |
| 7 | MgCl$_2$ . 2BuOH . 0.2EB | BuOH r.t. × 1 h; EB 80° C. × 1 h. Drying. | 7.6 | 3.8 | 16.9 | 62.05 | 4. | 14 | 90.5 | 92.5 | 4.2 | 0.40 |
| 8 (comparison) | MgCl$_2$ . 2BuOH . 0.2EB | EB r.t. × 1h; BuOH 80° C. × 1 h. Syphoning. | 2.8 | 5.25 | 16.4 | 60.65 | 12.5 | 45 | 87 | 92.5 | — | — |
| 9 | MgCl$_2$ . 2BuOH . 0.2EB | Adduct obtained by melting at 110° C. for 2 h. | 8.5 | 3.9 | 14.7 | 56.65 | 4.5 | 15 | 94 | 95.5 | 3.1 | 0.40 |
| 10 | MgCl$_2$ . 2BuOH . 0.2EB | BuOH 80° C. × 1 h. Drying. EB added during titanation. | 6.9 | 3.25 | 17.1 | 61.8 | 5.5 | 20 | 92 | 94.5 | 3.3 | 0.45 |
| 11 | MgCl$_2$ . 2BuOH . 0.2EB | EB + BuOH r.t. × 1 h. + 80° C. × 1 h. Drying. | 7.8 | 4.05 | 16.9 | 60.15 | 4. | 14 | 92.5 | 95. | 4. | 0.38 |

EB = ethyl benzoate; MFI = Melt Flow Index; AD = apparent or bulk density; r.t. = room temperature

TABLE 3

| Example | Adduct | Preparation modalities | Catalyst component % by weight | | | | Catalyst residues in the polymer ppm | | II_t | II powder | Polymer properties | |
|---|---|---|---|---|---|---|---|---|---|---|---|---|
| | | | EB | Ti | Mg | Cl | Ti | Mg | | | MFI | AD |
| 12 | MgCl$_2$ . BuOH . 0.3EB | As in Example 1 | 7.1 | 1.85 | 18.95 | 62.85 | 5.5 | 37 | 90.5 | 93.5 | 4 | 0.4 |
| 13 | MgCl$_2$ . 2BuOH . 0.3EB | As in Example 1 | 9.4 | 3.2 | 16.85 | 59.35 | 4.5 | 24 | 91.5 | 94.5 | 3.1 | 0.41 |
| 14 | MgCl$_2$ . 3BuOH . 0.2EB | As in Example 1 | 7.7 | 5.05 | 15.2 | 59.15 | 6. | 19 | 89.5 | 92.5 | 3.9 | 0.43 |
| 15 | MgCl$_2$ . 0.5BuOH . 0.2EB | As in Example 1 | 4.7 | 1.15 | 20.15 | 64.1 | 4.5 | 66 | 90. | 94.5 | 3.5 | 0.4 |
| 16 | MgCl$_2$ . 2BuOH . 0.15EB | As in Example 1 | 7.2 | 3.95 | 15. | 60.35 | 4. | 17 | 92.5 | 95.5 | 4.3 | — |
| 17 | MgCl$_2$ . 6BuOH . 0.6EB | By melting of the components at 110° C. × 1 h | 7.5 | 3.85 | 14.5 | 55.25 | 5. | 15 | 92.5 | 95.5 | 3. | — |
| 18 (comparison) | MgCl$_2$ . 2BuOH | BuOH 80° C. × 1 h Drying | — | 8. | 13.9 | 62.95 | 33. | 172 | 72. | 88.5 | — | — |

EB = ethylbenzoate; MFI = Melt Flow Index; AD = apparent or bulk density

EXAMPLE 19

In this test, the adduct was prepared only from MgCl$_2$ and BuOH in a 1:2 molar ratio, according to the modalities described in Example 1, with the only exception that the addition of ethyl benzoate was omitted. The benzoate was added, in a benzoate/alcohol molar ratio=0.2, during the treatment with TiCl$_4$, which was then carried on as in Example 1. The results reported below were obtained. Characteristics of the dry catalyst: Ti=3.25%; Mg=17.10%; Cl=61.80%; EB=6.9%; BuOH=2.1%.

Polymerization Test

Catalyst residues on the polymer as such: Ti=5.5 ppm; Mg=20 ppm; Cl=86 ppm.

Total isotactic index (II$_t$)=92.0.

Isotactic index determined on the powder (II powder)=94.5%

M.F.I. of the powder=3.3 g/10 minutes

Apparent density=0.45 g/cm$^3$

Flexural rigidity=13,250 kg/cm$^2$.

EXAMPLE 20

4.5 g of MgCl$_2$ (47.5 m.moles) were suspended in 73 ml of n-heptane containing 1.1 ml (7.3 m.moles) of ethyl benzoate at 25° C., and allowed to react for 2 hours. To the resulting suspension there were added, in 10 minutes, 100 ml of a heptane solution of phenol (8.9 g) and the whole was allowed to react at 80° C. for 2 hours. Heptane was removed at 50° C. under vacuum. The resulting white solid was treated with 150 ml of TiCl$_4$ at 110° C. for 2 hours; after this time period TiCl$_4$ was removed by filtration and an equal amount thereof was added. It was reacted for 2 hours at 110° C., whereupon it was washed with n-heptane at 90° C. until chlorine ions disappeared from the filtrate. On analysis, the catalyst component, after drying under vacuum, was found to have the following composition:

Ti=2.21%
Cl=61.97%
EB=7.2%.

That component was used as catalyst-forming component for the propylene polymerization test which was carried out under the following conditions:

5 m.moles of a mixture of Al-trialkyls, having the following composition of the gases (percent by volume) after hydrolysis:

ethane=9.
isobutene=49.4
n-butane=41.2
propane=0.16
isobutene=0.24 were reacted at room temperature with 1.25 m.moles of methyl p-toluate in 80 ml of n-heptane (anhydrous and desulphurized) for 5 minutes.

50 ml of such solution were contacted with 100 mg of the catalyst component; the remaining 30 ml were diluted to 1000 ml with n-heptane and placed, under a nitrogen pressure, in a steel autoclave having a 3000 ml capacity, equipped with a magnetic anchor-stirrer and a thermometer, thermoregulated at 40° C., and into which a flow of propylene was introduced.

In the same way, the catalyst component suspension was then introduced. After closing the autoclave, hydrogen was added up to a partial pressure of 0.1 atm. The mass was heated to 60° C. under simultaneous feeding of propylene up to a total pressure of 5 atm., and that pressure was maintained throughout the polymerization by keeping the propylene feed constant.

After 4 hours, the polymerization was stopped and polypropylene was isolated by treatment with methanol and acetone. 375 g of polypropylene, corresponding to a yield of 170,000 g of polymer/g of Ti, were obtained, the heptane residue i.e., the content of isotactic macromolecules insoluble in boiling n-heptane comprised in the total or crude polymerizate, being of 92%; $\eta_i = 1.90$ dl/g.

EXAMPLE 21

Example 20 was repeated, with the only exception that, instead of phenol, 95 m. moles of 4-tert.-butylphenol were used. An analysis of the product obtained after reaction with $TiCl_4$ and drying under vacuum gave the following percentages by weight: Ti=2.49; Mg=20.07; ethyl benzoate=9. The polymerization test, conducted as in Example 20, gave the following results: g of polymer/g of Ti=230,000; heptane residue=92.5%; $\eta_i = 1.54$ dl/g.

EXAMPLE 22

By repeating Example 20, with the only exception that instead of phenol, 95 m. moles of p-cresol were employed, and conducting the polymerization test under the conditions of Example 20, the following results were obtained: g of polymer/g of Ti=220,000; heptane residue=92%; $_i = 1.85$ dl/g.

EXAMPLE 23

Repeating Example 20, with the only exception that instead of phenol, 95 m. moles of beta-naphthol were employed, and conducting the polymerization test under the same conditions as in Example 20, the following results were obtained: g of polymer/g of Ti=230,000; heptane residue=91.5% $\eta_i = 2.00$ dl/g.

EXAMPLE 24

17.41 g of $MgCl_2 \cdot 3{,}3n\text{-}C_4H_9OH$ (51 m. moles), obtained in microspheroidal form (particles diameter $< 50\mu$) through a spray-cooling process from molten $MgCl_2 \cdot 4n\text{-}C_4H_9OH$ by means of a NIRO ATOMIZER apparatus, were suspended in 200 ml of n-heptane, and at 0° C. 2.9 ml (25.6 m.moles) of benzoyl chloride and 100 ml of $TiCl_4$ were simultaneously dropped into the suspension. After 30 minutes, at the conclusion of the dropping, 200 ml of $TiCl_4$ were added and the temperature was gradually brought to 110° C. The reaction was carried on for 1 hour, after which the solid component was separated by filtration and treated with further 200 ml of $TiCl_4$. After a 2-hour reaction at 110° C., $TiCl_4$ was removed by filtration and the solid was washed with n-heptane at 90° C. until chlorine ions disappeared from the filtrate. Subjected to analysis, the catalyst component exhibited the following percent composition:

Mg=27.26
Ti=2.01
Cl=55.5
EB=8.

The propylene polymerization test, carried out under the conditions of Example 20, provided a polymer with a yield of 208,000 g of polymer/g of Ti; heptane residue=93%; $\eta_i = 2.12$ dl/g. The size of 80% of the polymer particles ranged from 105 to 710$\mu$. Particles with sizes < 105$\mu$ were absent.

EXAMPLE 25

A solution of 3.1 moles of $C_2H_5MgCl$ in diethyl ether was added at 5° C. dropwise and under stirring to a solution in toluene of 1.5 moles of $C_2H_5OH$ containing anhydrous HCl in a ratio HCl/Mg of 3.3.

The mixture was stirred at room temperature for 1.5 h and then the solid product separated by filtration, washed with n-heptane and dried at 35° C. under vacuum.

20 g of the solid were added to 500 cc of n-heptane in which ethyl benzoate was dissolved in a ratio of 0.2 moles per g atom Mg. The suspension was heated at 60° C. for 1 h.

200 cc of the suspension were reacted with $TiCl_4$ at 110° C. for 2 h with a ratio Ti/Mg of 15.1. The suspension was hot-filtered and then the solid repeatedly washed with n-heptane until the disappearance of $TiCl_4$, and thereafter dried.

The solid was analyzed and found to have the following composition by weight: Ti=2.7; Cl=63; Mg=19; ethyl benzoate=7.6.

0.075 g of the product were used in a polymerization test under the same conditions as in example 1 with the only difference that the pressure was maintained at 9 atm.

465 g polymer were obtained (yield 230 kg polymer/g Ti) with a heptane residue of 92).

EXAMPLE 26

Example 25 was repeated with the only difference that a solution of 0.885 moles of n-$C_4H_9MgCl$ in dibutyl ether was used.

The composition by weight of the solid product after the reaction with $TiCl_4$ was: Ti=2.92; Mg=20; Cl=62.9; ethyl benzoate=6.7.

0.057 g of the solid were used in a propylene polymerization test under the same conditions as those of example 25.

385 g polymer were obtained (yield=203 kg polymer/g Ti) with a heptane residue of 93.5.

EXAMPLE 27

9.72 g of Mg metal in the form of 35–50 mesh flakes were reacted at 40° C. for 1 h and then at 60° C. for another hour with a solution in toluene of 4 moles of $C_2H_5OH$, containing anhydrous HCl in a ratio HCl/Mg of 2.77.

20 g of the solid were added to 500 cc of n-heptane in which ethyl benzoate was dissolved in a ratio of 0.2 m.moles per g atom Mg.

The suspension was heated at 60° C. for 1 h. 200 cc of the suspension were reacted with $TiCl_4$ at 120° C. for 2 h with a ratio Ti/Mg of 20.

The suspension was hot-filtered and the solid washed with n-heptane until the disappearance of $TiCl_4$.

0.043 g of the solid were used in a polymerization test under the same conditions as in example 25.

270 g polymer were obtained with a heptane residue of 90.

EXAMPLE 28

30 g $MgCl_2.6H_2O$ were refluxed for 100 h with 1000 cc of $(CH_3)_3SiCl$.

The solid product separated by filtration and washed with n-heptane, was dried at 60° C.

It showed a water content of 0.71% by weight. 9.1 g of the product were suspended in 100 cc of n-heptane and thereafter 0.194 moles of $C_2H_5OH$ and 0.016 moles of ethyl benzoate dissolved in 25 cc n-heptane were added dropwise. The mixture was reacted for 1 h at room temperature and then added with 350 cc $TiCl_4$ and reacted at 100° C. for 2 h. The suspension was hot-filtered and the solid washed with n-heptane until the disappearance of $TiCl_4$, and then dried.

The composition by weight was: Ti=35%; Mg=17.3%; Cl=58%; ethyl benzoate=9%.

0.037 g of the solid were used in a propylene polymerization test under the some conditions as in example 20.

190 g polymer were obtained (yield=153 kg polymer/g Ti) with a heptane residue of 91.1.

EXAMPLE 29

The same procedure of example 28 was followed with the only difference that $(CH_3)_2 SiCl_2$ was used.

The propylene polymerization test gave the following results: yield=164 kg polymer/gTi; heptane residue=91.

What we claim is:

1. Process for preparing solid catalyst components for the polymerization of alpha-olefins and mixtures thereof with ethylene, which comprises reacting a Ti compound containing at least one Ti-halogen linkage with at least one of the following substances:

(1) a hydrocarbyl electron-donor compound ED which does not contain active hydrogen atoms and an adduct (a) of a Mg dihalide with at least one hydrocarbyl electron-donor compound AH containing active hydrogen atoms and present in the adduct in an amount of at least 0.5 moles/mole of Mg dihalide, electron-donor compound ED being reacted in an amount of not less than 0.05 moles/-mole of compound AH of the adduct;

(2) an adduct (b) of at least a Mg dihalide with a compound AH and ED, as defined in (1), compound ED being present in an amount ranging from 0.05 to 1 mole/mole of compound AH, and adducts (a) and (b) being prepared without co-grinding of the Mg dihalide with compounds AH and ED; the amount of compound ED that remains in the solid after extraction thereof with $TiCl_4$ at 80° C. for 2 hours being comprised between 0.3 and 3 moles/gram atom of Ti, and the amount of Ti compounds extractable with $TiCl_4$ at 80° C. being lower than 50%.

2. The process of claim 1, in which adduct (a) and/or (b) comprises from 0.5 to 6 moles, per mole of Mg dihalide, of a hydrocarbyl electron-donor compound containing active hydrogen atoms and selected from the group consisting of aliphatic and cycloaliphatic alcohols and phenols having no substituents in ortho position.

3. The process of claim 2, in which $TiCl_4$ is reacted with an adduct obtained from a Mg dihalide, 0.5-6 moles of the hydrocarbyl electron-donor compound containing active hydrogen atoms, and 0.05-1 mole, per mole of the hydrocarbyl electron-donor containing active hydrogen atoms, of a hydrocarbyl electron-donor compound selected from the group consisting of alkyl, aryl and cycloalkyl esters of aromatic acids.

4. The process of claim 1, in which $TiCl_4$ is reacted with an adduct (a) and with a hydrocarbyl electron-donor compound ED selected from the group consisting of alkyl, aryl and cycloalkyl esters of aromatic acids, compound ED being reacted in an amount of at least 0.05 moles/mole of compound AH of adduct (a).

5. The process of claim 4, in which the ester is formed in situ by esterification reaction between the alcohol of adduct (a) and an aromatic acid halide.

6. The process of claim 5, in which the aromatic acid halide is benzoyl chloride.

7. The process of claim 2, in which the adduct (a) and/or (b), comprising 0.5 to 6 moles/mole of Mg dihalide of an alcohol or phenol is prepared by reaction of Mg metal or of a RMgX compound, in which R is an alkyl, cycloalkyl or aryl radical containing 1 to 20 carbon atoms and X is halogen, with the alcohol or phenol and with a hydrogen halide.

* * * * *